(12) United States Patent
Lacy

(10) Patent No.: US 8,870,535 B2
(45) Date of Patent: *Oct. 28, 2014

(54) AIRFOIL

(75) Inventor: Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 462 days.

This patent is subject to a terminal disclaimer.

(21) Appl. No.: 13/349,852

(22) Filed: Jan. 13, 2012

(65) Prior Publication Data

US 2013/0183165 A1 Jul. 18, 2013

(51) Int. Cl.
*F01D 5/18* (2006.01)

(52) U.S. Cl.
USPC ........................................... 416/97 R

(58) Field of Classification Search
CPC ............. F01D 5/00; F01D 5/08; F01D 5/081; F01D 5/082; F01D 5/085; F01D 5/087; F01D 5/18; F01D 5/186; F05D 2260/202; F05D 2260/221; F05D 2260/2214
USPC ..................... 416/95, 96 R, 97 R, 235, 236 R
See application file for complete search history.

(56) References Cited

U.S. PATENT DOCUMENTS

| | | | |
|---|---|---|---|
| 4,672,727 A * | 6/1987 | Field | 29/889.721 |
| 5,374,162 A | 12/1994 | Green | |
| 5,458,461 A | 10/1995 | Lee et al. | |
| 5,486,093 A * | 1/1996 | Auxier et al. | 416/97 R |
| 6,050,777 A | 4/2000 | Tabbita et al. | |
| 6,164,912 A * | 12/2000 | Tabbita et al. | 416/97 R |
| 6,210,111 B1 | 4/2001 | Liang | |
| 6,210,112 B1 * | 4/2001 | Tabbita et al. | 416/97 R |
| 6,994,521 B2 * | 2/2006 | Liang | 416/97 R |
| 7,553,534 B2 * | 6/2009 | Bunker | 428/137 |
| 2010/0040478 A1 * | 2/2010 | Abdel-Messeh et al. | 416/97 R |
| 2010/0068033 A1 * | 3/2010 | Liang | 415/115 |
| 2010/0150733 A1 * | 6/2010 | Abdel-Messeh et al. | 416/97 R |
| 2011/0097188 A1 * | 4/2011 | Bunker | 415/1 |
| 2011/0305582 A1 * | 12/2011 | Lee et al. | 416/97 R |

* cited by examiner

*Primary Examiner* — Edward Look
*Assistant Examiner* — Eldon Brockman
(74) *Attorney, Agent, or Firm* — Dority & Manning, PA

(57) ABSTRACT

An airfoil includes a platform and an exterior surface connected to the platform. A plurality of trench segments are on the exterior surface, and a single cooling passage in each trench segment supplies a cooling media to the exterior surface.

21 Claims, 6 Drawing Sheets

AIRFOIL

FIELD OF THE INVENTION

The present invention generally involves an airfoil, such as might be used in a turbine.

BACKGROUND OF THE INVENTION

Turbines are widely used in a variety of aviation, industrial, and power generation applications to perform work. Each turbine generally includes alternating stages of circumferentially mounted stator vanes and rotating blades. Each stator vane and rotating blade may include high alloy steel and/or ceramic material shaped into an airfoil, and a compressed working fluid, such as steam, combustion gases, or air, flows across the stator vanes and rotating blades along a gas path in the turbine. The stator vanes accelerate and direct the compressed working fluid onto the subsequent stage of rotating blades to impart motion to the rotating blades and perform work.

High temperatures associated with the compressed working fluid may lead to increased wear and/or damage to the stator vanes and/or rotating blades. As a result, a cooling media may be supplied inside the airfoils and released through the airfoils to provide film cooling to the outside of the airfoils. Trenches in the airfoils evenly distribute the cooling media across the external surface of the airfoils. However, an improved airfoil that varies the distribution of the cooling media across the external surface of the airfoils would be useful.

BRIEF DESCRIPTION OF THE INVENTION

Aspects and advantages of the invention are set forth below in the following description, or may be obvious from the description, or may be learned through practice of the invention.

One embodiment of the present invention is an airfoil that includes an interior surface and an exterior surface opposed to the interior surface. The exterior surface includes a pressure side, a suction side opposed to the pressure side, a stagnation line between the pressure and suction sides, and a trailing edge between the pressure and suction sides and downstream from the stagnation line. One or more trench segments are on the exterior surface, and a single cooling passage in each trench segment provides fluid communication from the interior surface to the exterior surface.

Another embodiment of the present invention is an airfoil that includes a platform and an exterior surface connected to the platform. One or more trench segments are on the exterior surface, and a single cooling passage in each trench segment supplies a cooling media to the exterior surface.

In yet another embodiment, an airfoil includes an interior surface and an exterior surface opposed to the interior surface. The exterior surface includes a pressure side, a suction side opposed to the pressure side, a stagnation line between the pressure and suction sides, and a trailing edge between the pressure and suction sides and downstream from the stagnation line. One or more trench segments are on at least one of the pressure side, suction side, stagnation line, or trailing edge, and a single cooling passage in each trench segment provides fluid communication from the interior surface to the exterior surface.

Another embodiment of the present invention is an airfoil that includes an interior surface and an exterior surface opposed to the interior surface, wherein the exterior surface comprises a pressure side, a suction side opposed to the pressure side, a stagnation line between the pressure and suction sides, and a trailing edge between the pressure and suction sides and downstream from the stagnation line. At least one of a platform or sidewall is adjacent to the exterior surface. One or more trench segments are on the platform or sidewall, and a single cooling passage is in each trench segment.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
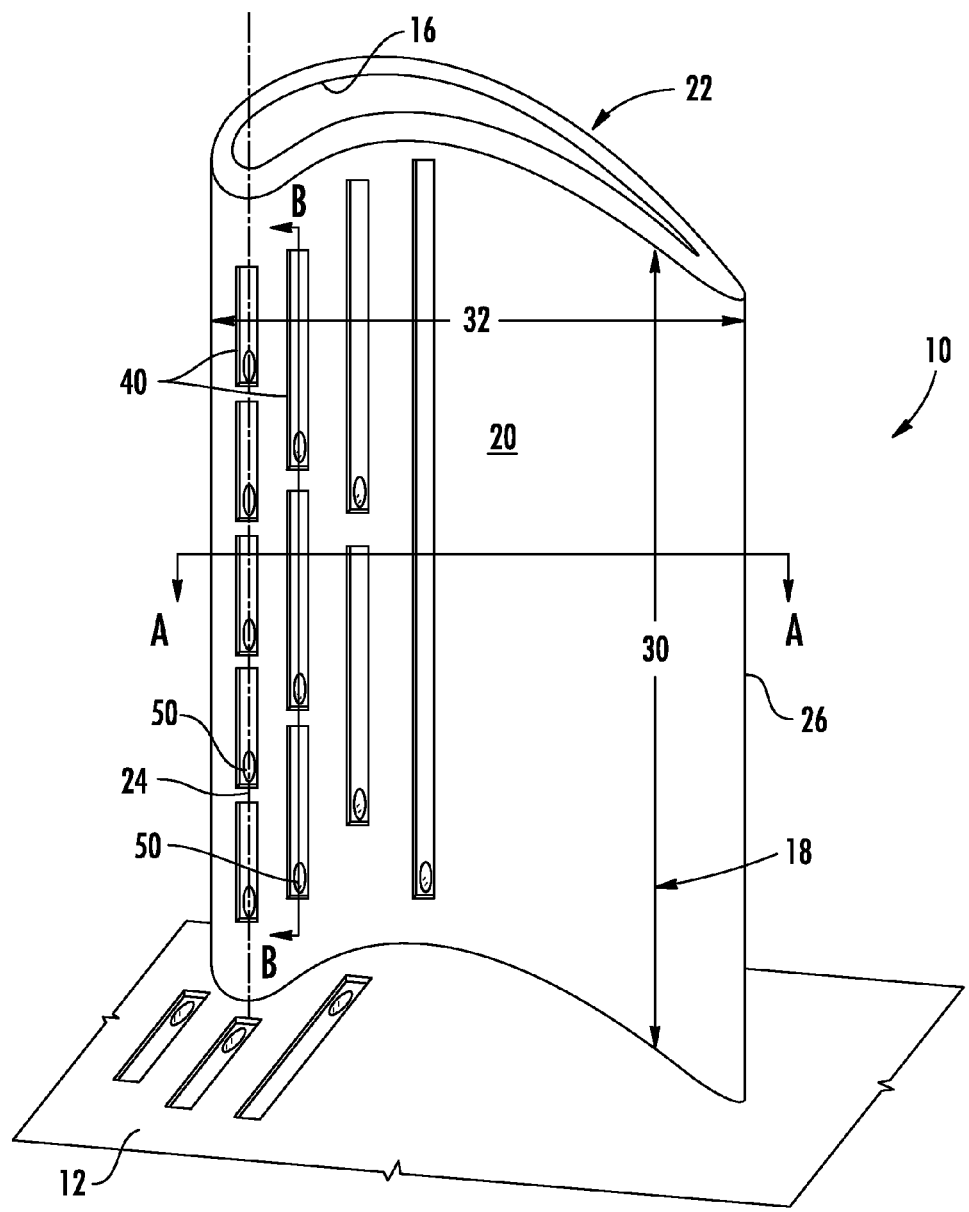
FIG. 1 is a perspective view of an airfoil according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
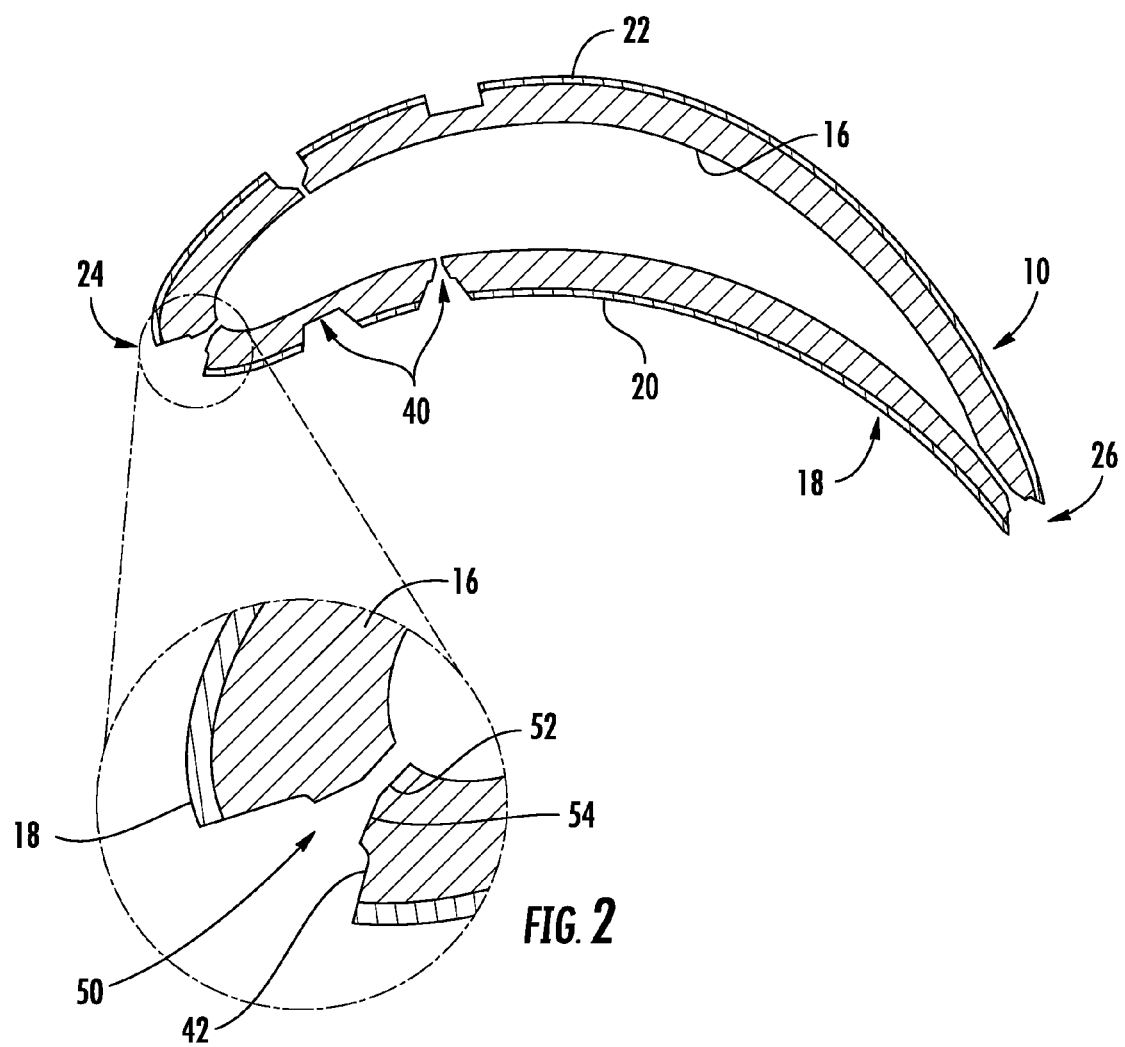
FIG. 2 is an axial cross-section view of the airfoil shown in FIG. 1 taken along line A-A.
Figure 3:
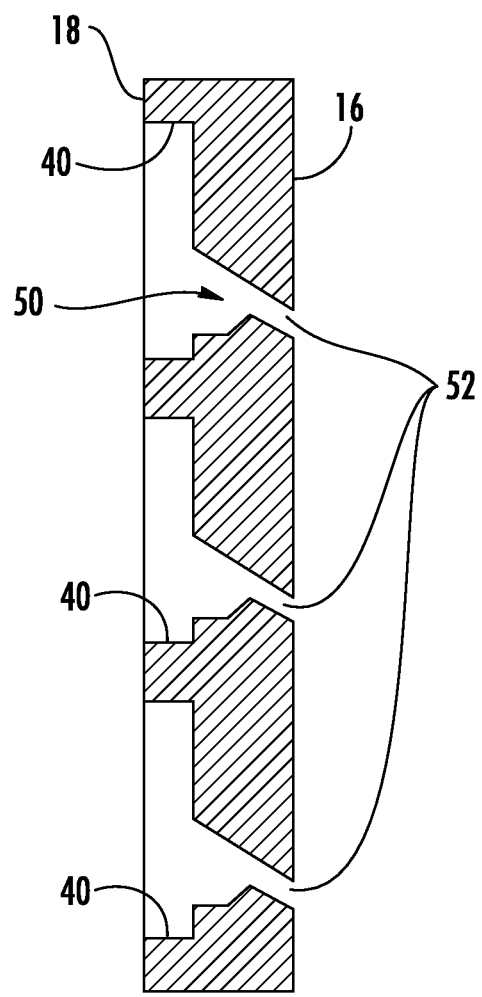
FIG. 3 is a radial cross-section view of the airfoil shown in FIG. 1 taken along line B-B.

FIG. 1 provides a perspective view of an airfoil 10 according to one embodiment of the present invention, and FIGS. 2 and 3 provide axial and radial cross-section views of the airfoil 10 shown in FIG. 1 taken along lines A-A and B-B, respectively. The airfoil 10 may be used, for example, as a rotating blade or stationary vane in a turbine to convert kinetic energy associated with a compressed working fluid into mechanical energy. The compressed working fluid may be steam, combustion gases, air, or any other fluid having kinetic energy. As shown in FIGS. 1-3, the airfoil 10 is generally connected to a platform or sidewall 12. The platform or sidewall 12 generally serves as the radial boundary for a gas path inside the turbine and provides an attachment point for the airfoil 10. The airfoil 10 may include an interior surface 16 and an exterior surface 18 opposed to the interior surface 16 and connected to the platform 12. The exterior surface generally includes a pressure side 20 and a suction side 22 opposed to the pressure side 20. As shown in FIGS. 1 and 2, the pressure side 20 is generally concave, and the suction side 22 is generally convex to provide an aerodynamic surface over which the compressed working fluid flows. A stagnation line 24 at a leading edge of the airfoil 10 between the pressure and suction sides 20, 22 represents the position on the exterior surface 18 that generally has the highest temperature. A trailing edge 24 is between the pressure and suction sides 20, 22 and downstream from the stagnation line 24. In this manner, the exterior surface 18 creates an aerodynamic surface suitable for converting the kinetic energy associated with the compressed working fluid into mechanical energy.

The exterior surface 18 generally includes a radial length 30 that extends from the platform 12 and an axial length 32 that extends from the stagnation line 24 to the trailing edge 26. One or more trench segments 40 extend radially and/or axially in the exterior surface 18, and each trench segment 40 includes a single cooling passage 50 that provides fluid communication from the interior surface 16 to the exterior surface 18. In this manner, cooling media may be supplied inside the airfoil 10, and the cooling passages 50 allow the cooling media to flow through the airfoil 10 to provide film cooling to the exterior surface 18.

The trench segments 40 may be located anywhere on the airfoil 10 and/or platform or sidewall 12 and may be of uniform or varying lengths. In addition, the trench segments 40 may be straight or arcuate and may be aligned or staggered with respect to one another. For example, as shown in FIG. 1, the trench segments 40 may be arranged in columns and/or rows on the platform or sidewall 12, the pressure side 20, and the stagnation line 24. Alternately or in addition, the trench segments 40 may be located on the suction side 22 and/or the trailing edge 26. In the particular embodiment shown in FIG. 1, each trench segment 40 is substantially straight and extends radially along the exterior surface 18. In addition, trench segments 40 in adjacent columns have different lengths and are staggered with respect to one another so that the ends of the trench segments 40 in adjacent columns do not coincide. In this manner, the rows of trench segments 40 overlap one another to enhance radial distribution of the cooling medium flowing through the cooling passages 50. In alternate embodiments, single cooling passage 50 trench segments 40 may be combined with trench segments 40 having more than one cooling passage 50, and the length of the trench segments 40 may vary up to the entire radial length 30 of the exterior surface 18.

As shown most clearly in FIGS. 2 and 3, each trench segment 40 generally includes opposing walls 42 that define a depression or groove in the exterior surface 18. The opposing walls 42 may be straight or curved and may define a constant or varying width for the trench segments 40. The single cooling passages 50 in adjacent trench segments 40 may be aligned with or offset from one another. Each single cooling passage 50 may include a first section 52 that terminates at the interior surface 16 and a second section 54 that terminates at the exterior surface 18. The first section 52 may have a cylindrical shape, and the second section 54 may have a conical or spherical shape. As shown in FIG. 3, the first section 52 may be angled with respect to the second section 54 and/or the trench segment 40 to provide directional flow for the cooling media flowing through the single cooling passage 50 and into the trench segment 40. Alternately or in addition, the second section 54 and/or the walls 42 of the trench segment 40 may be asymmetric to preferentially distribute the cooling media across the exterior surface 18.

Figure 4:
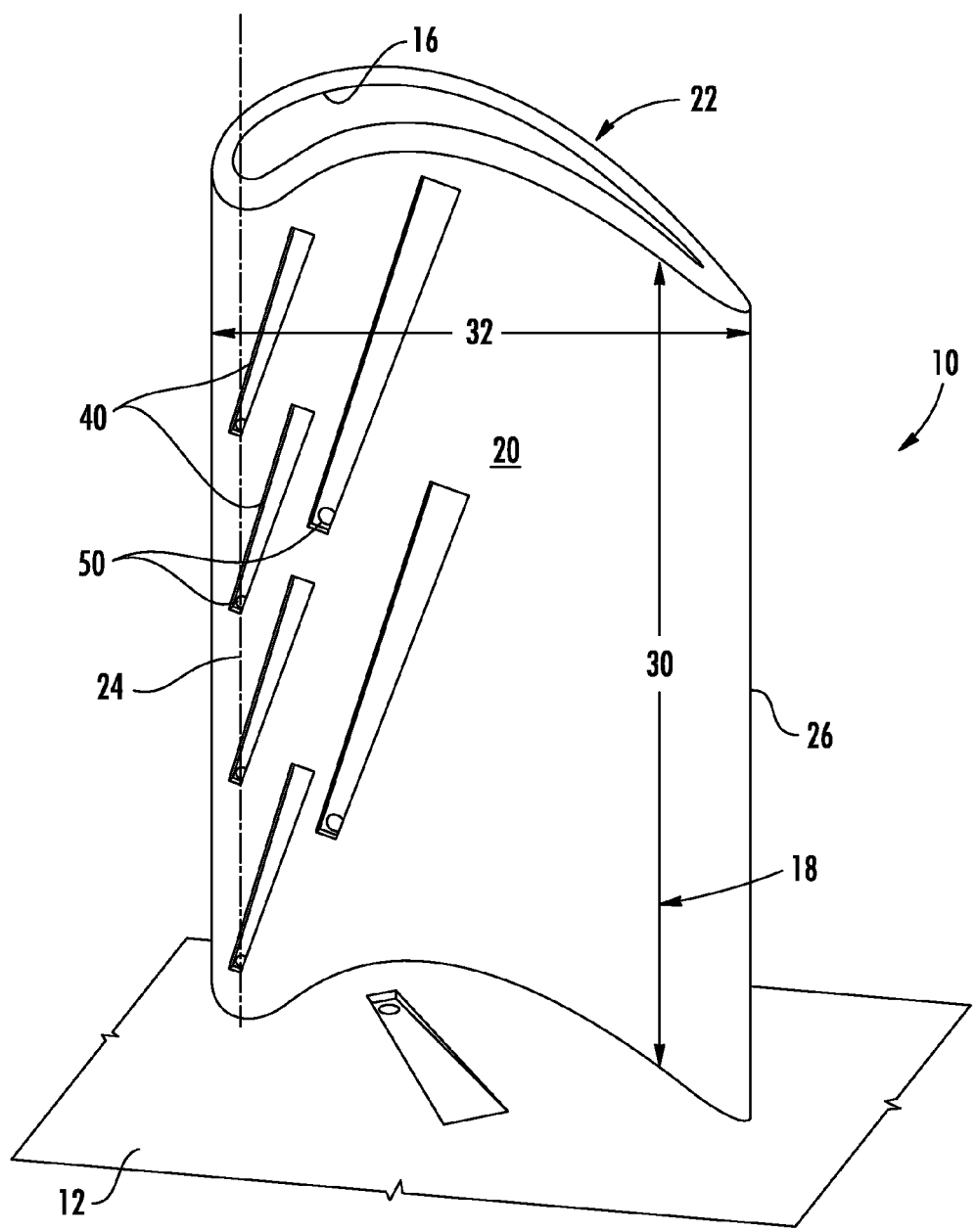
FIG. 4 is a perspective view of an airfoil according to a second embodiment of the present invention.

FIG. 4 provides a perspective view of the rotating blade 10 according to a second embodiment of the present invention. As shown, the airfoil 10 again includes the platform or sidewall 12, trench segments 40, and single cooling passages 50 as previously described with respect to FIGS. 1-3. In this particular embodiment, the trench segments 40 are straight and extend diagonally along the exterior surface 18. In addition, each trench segment 40 extends less than 50% of the radial and/or axial length 30, 32 of the exterior surface 18 and has a varying width and/or depth. The varying width and/or depth and diagonal placement of the trench segments 40 alter the distribution of the cooling media across the exterior surface 18. For example, widening the trench segments 40 and making them shallower as they move away from the cooling passages 50 may assist in diffusing the cooling media across the exterior surface 18.

Figure 5:
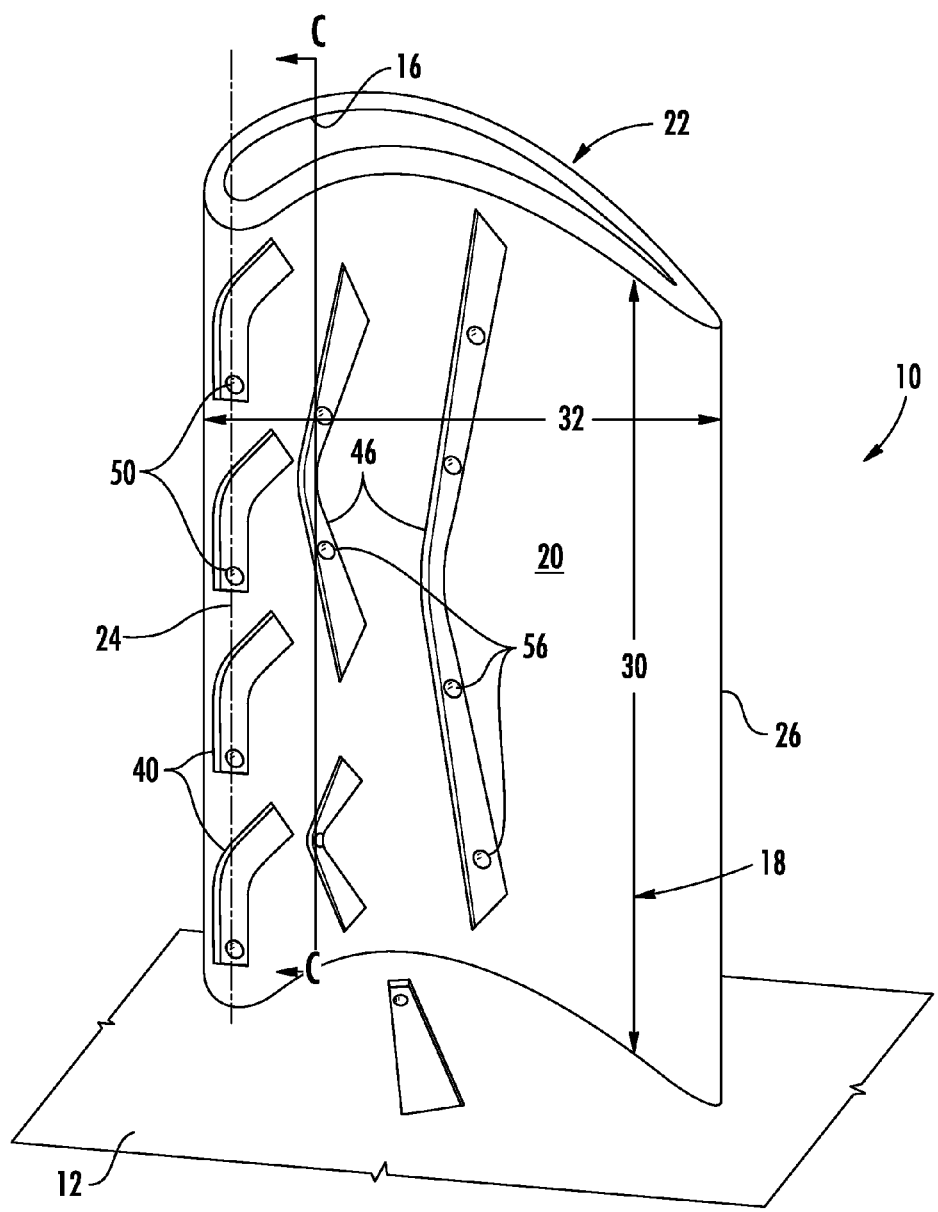
FIG. 5 is a perspective view of an airfoil according to a third embodiment of the present invention.
Figure 6:
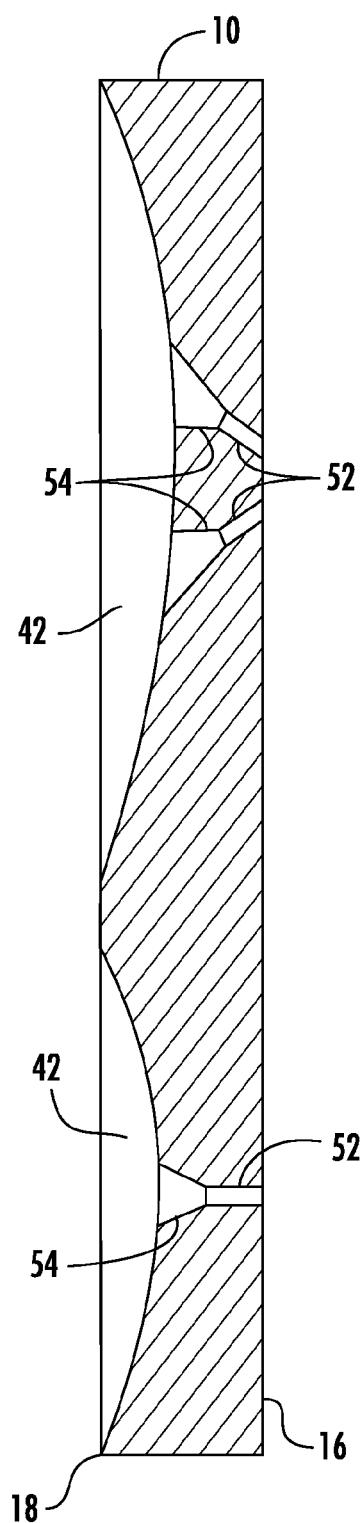
FIG. 6 is a radial cross-section view of the airfoil shown in FIG. 5 taken along line C-C.

FIG. 5 provides a perspective view of the airfoil 10 according to a third embodiment of the present invention, and FIG. 6 provides a radial cross-section view of the airfoil 10 shown in FIG. 5 taken along line C-C. As shown, the airfoil 10 again includes the platform 12, trench segments 40, and cooling passages 50 as previously described with respect to FIGS. 1-3. In this particular embodiment, the trench segments 40 are curved or arcuate along the exterior surface 18 and have a varying width and/or depth. In this manner, the curved trench segments 40 curve or turn the cooling media flow through the trench segments 40. In addition, some trench segments 40 extend less than 50% of the radial and/or axial length 30, 32 of the exterior surface 18 and include the single cooling passage 50, as in FIGS. 1-3. However, other trench segments 46 extend greater than 50% of the radial and/or axial length 30, 32 of the exterior surface 18 and include multiple cooling passages 56.

One or more cooling passages 56 may be angled with respect to the trench segment 46 to preferentially direct the cooling media in the trench segment 46. Specifically, as shown most clearly in FIG. 6, the first and/or second sections 52, 54 in one or more cooling passages 56 may be angled toward the wider and/or shallower portion of the trench segments 46. In this manner, the angled cooling passages 58, in combination with the varying width and/or depth of the trench segments 46, enhance the distribution of the cooling media along the exterior surface 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil, comprising:
   a. an interior surface;
   b. an exterior surface opposed to the interior surface, wherein the exterior surface comprises a pressure side, a suction side opposed to the pressure side, a stagnation line between the pressure and suction sides, and a trailing edge between the pressure and suction sides and downstream from the stagnation line;

c. a plurality of trench segments on the exterior surface, each trench segment being partitioned from radially adjacent trench segments by one or more walls which include a portion of the exterior surface; and d. a single cooling passage in each trench segment, wherein each single cooling passage provides fluid communication from the interior surface into the corresponding trench segment and onto the exterior surface.

2. The airfoil as in claim 1, wherein at least one trench segment is at least partially located on the stagnation line between the pressure and suction sides.

3. The airfoil as in claim 1, wherein at least two adjacent trench segments are staggered with respect to one another.

4. The airfoil as in claim 1, wherein at least two adjacent trench segments have different lengths.

5. The airfoil as in claim 1, wherein at least one trench segment is arcuate.

6. The airfoil as in claim 1, wherein at least one trench segment has a varying dimension along a length of the at least one trench segment.

7. The airfoil as in claim 1, wherein at least one trench segment has a decreasing dimension, and the single cooling passage in the at least one trench segment is angled toward the decreasing dimension.

8. The airfoil as in claim 1, wherein the single cooling passages in adjacent trench segments are offset from one another.

9. The airfoil as in claim 1, wherein each single cooling passage comprises a first section that terminates at the interior surface and a second section that terminates at the exterior surface, and the first section has a cylindrical shape, and the second section has a conical or spherical shape.

10. An airfoil, comprising:

a. a platform;

b. an exterior surface connected to the platform;

c. a plurality of trench segments on the exterior surface, each trench segment being partitioned from radially adjacent trench segments by one or more walls which include a portion of the exterior surface; and d. a single cooling passage in each trench segment, wherein each single cooling passage supplies a cooling media into the corresponding trench segment.

11. The airfoil as in claim 10, further comprising a stagnation line on the exterior surface, wherein at least one trench segment is at least partially located on the stagnation line.

12. The airfoil as in claim 10, wherein at least two adjacent trench segments are staggered with respect to one another.

13. The airfoil as in claim 10, wherein at least two adjacent trench segments have different lengths.

14. The airfoil as in claim 10, wherein at least one trench segment is arcuate.

15. The airfoil as in claim 10, wherein at least one trench segment has a varying dimension along a length of the at least one trench segment.

16. The airfoil as in claim 10, wherein at least one trench segment has a decreasing dimension, and the single cooling passage in the at least one trench segment is angled toward the decreasing dimension.

17. The airfoil as in claim 10, further comprising a platform trench segment in the platform.

18. The airfoil as in claim 10, wherein the single cooling passages in adjacent trench segments are offset from one another.

19. The airfoil as in claim 10, wherein each single cooling passage comprises a first section having a cylindrical shape and a second section having a conical or spherical shape.

20. An airfoil, comprising:

a. an interior surface;

b. an exterior surface opposed to the interior surface, wherein the exterior surface comprises a pressure side, a suction side opposed to the pressure side, a stagnation line between the pressure and suction sides, and a trailing edge between the pressure and suction sides and downstream from the stagnation line;

c. a plurality of trench segments disposed on at least one of the pressure side, suction side, stagnation line, or trailing edge, each trench segment being partitioned from radially adjacent trench segments by one or more walls which include a portion of the exterior surface; and d. a single cooling passage disposed within each trench segment, wherein the single cooling passage provides fluid communication from the interior surface into the trench segment.

21. An airfoil, comprising:

a. an interior surface;

b. an exterior surface opposed to the interior surface, wherein the exterior surface comprises a pressure side, a suction side opposed to the pressure side, a stagnation line between the pressure and suction sides, and a trailing edge between the pressure and suction sides and downstream from the stagnation line;

c. at least one of a platform or sidewall adjacent to the exterior surface;

d. a plurality of trench segments on the platform or sidewall, each trench segment being partitioned from axially adjacent trench segments by one or more walls which include a portion of the exterior surface; and e. a single cooling passage in each trench segment.

* * * * *